(12) United States Patent
Yuan

(10) Patent No.: US 9,726,828 B2
(45) Date of Patent: Aug. 8, 2017

(54) MULTI-FUNCTION CUTTING FIXTURE

(75) Inventor: Qingyun Yuan, Weihai (CN)

(73) Assignee: Inno Instrument (China) Inc., Weihai (CN)

( * ) Notice: Subject to any disclaimer, the term of this patent is extended or adjusted under 35 U.S.C. 154(b) by 37 days.

(21) Appl. No.: 14/377,805

(22) PCT Filed: Feb. 21, 2012

(86) PCT No.: PCT/CN2012/000218
§ 371 (c)(1),
(2), (4) Date: Aug. 8, 2014

(87) PCT Pub. No.: WO2013/116958
PCT Pub. Date: Aug. 15, 2013

(65) Prior Publication Data
US 2015/0323746 A1 Nov. 12, 2015

(30) Foreign Application Priority Data

Feb. 10, 2012 (CN) .................... 2012 2 0043376 U

(51) Int. Cl.
*G02B 6/36* (2006.01)
*G02B 6/25* (2006.01)
*G02B 6/24* (2006.01)

(52) U.S. Cl.
CPC ............ *G02B 6/3616* (2013.01); *G02B 6/24* (2013.01); *G02B 6/25* (2013.01); *G02B 6/36* (2013.01)

(58) Field of Classification Search
CPC ........ G02B 6/3616; G02B 6/25; G02B 6/255; G02B 6/3839

USPC .............................. 385/135, 136, 137, 65, 83
See application file for complete search history.

(56) References Cited

U.S. PATENT DOCUMENTS

| 4,046,454 A * | 9/1977 | Pugh, III | ............. G02B 6/3636 385/59 |
| 4,725,114 A * | 2/1988 | Murphy | ............... G02B 6/2826 385/59 |
| 4,750,804 A * | 6/1988 | Osaka | .................. G02B 6/3652 385/137 |

(Continued)

*Primary Examiner* — Monica Carter
*Assistant Examiner* — Seahee Yoon
(74) *Attorney, Agent, or Firm* — Anova Law Group, PLLC

(57) ABSTRACT

The utility model relates to the technical field of optical fiber cutting device, and particularly relates to a kind of multi-function cutting fixture which is used to fix the optical fiber in cutting process. The utility model of multi-function cutting fixture for the optical fiber cutting device includes the clamp body and the clamp cover. One side of the said clamp body is pivoted to the said clamp cover, and the other side of the said clamp body is clamping connected to the said clamp cover. The said clamp body is equipped at least with No.1 fiber placing groove, No.2 fiber placing groove and No.3 fiber placing groove. The said clamp cover is equipped with the elastomer that contacts with the said No.1 fiber placing groove, and No.1 contact structure that contacts with the said No.2 fiber placing groove. The said No.1 contact structure is equipped with a convex body that contacts with the said No.3 fiber placing groove. Compared with the prior art, the utility model of multi-function cutting fixture can hold a variety of types of optical fiber. When holding different types of optical fiber, we do not need to change the fixture. The work efficiency is improved greatly.

20 Claims, 3 Drawing Sheets

(56) References Cited

U.S. PATENT DOCUMENTS

| | | | | |
|---|---|---|---|---|
| 5,104,021 | A * | 4/1992 | Seike | G02B 6/25 |
| | | | | 225/2 |
| 5,400,426 | A * | 3/1995 | de Jong | G02B 6/3801 |
| | | | | 385/95 |
| 5,566,268 | A * | 10/1996 | Radliff | G02B 6/4471 |
| | | | | 385/114 |
| 6,132,105 | A * | 10/2000 | Konda | G02B 6/3885 |
| | | | | 385/65 |
| 6,640,042 | B2 * | 10/2003 | Araki | G02B 6/4471 |
| | | | | 385/135 |
| 6,695,491 | B1 * | 2/2004 | Leeman | G02B 6/4471 |
| | | | | 385/87 |
| 6,985,666 | B2 * | 1/2006 | Takano | G02B 6/3806 |
| | | | | 385/137 |
| 7,316,390 | B2 * | 1/2008 | Burlison | B25B 1/20 |
| | | | | 269/274 |
| 7,546,020 | B2 * | 6/2009 | Honma | G02B 6/255 |
| | | | | 385/137 |

\* cited by examiner

MULTI-FUNCTION CUTTING FIXTURE

TECHNICAL FIELD

The utility model relates to the technical field of optical fiber cutting device, and particularly relates to a kind of multi-function cutting fixture which is used to fix the optical fiber in cutting process.

BACKGROUND ART

At present, the optical fiber is placed on a fiber placing groove first, and then is cut after being clamped. In general there are several kind of fibers such as jacket cable, jumper wire, 900 um optical fiber and 250 um optical fiber, etc. The current cutting fiber placing groove only can hold one or two types of fiber. When cutting different types of fiber, the fiber placing groove should be replaced into the match, and it is an inconvenient operation bringing low working efficiency.

SUMMARY OF THE UTILITY MODEL

The aim of the utility model is to provide with an optical fiber cutting device to solve the technical problems in the existing optical fiber cutting device. These problems make the fiber placing groove only can hold one or two types of fiber. When cutting different types of fiber, the fiber placing groove should be replaced into the match, and it is an inconvenient operation bringing low working efficiency.

The aim of the utility model is realized by the following technical scheme:

A multi-function cutting fixture used in optical fiber cutting device includes the clamp body and the clamp cover. One side of the said clamp body is pivoted to the said clamp cover, and the other side of the said clamp body is clamping connected to the said clamp cover. The said clamp body is equipped at least with No.1 fiber placing groove, No.2 fiber placing groove and No.3 fiber placing groove. The said clamp cover is equipped with the elastomer that contacts with the said No.1 fiber placing groove, and No.1 contact structure that contacts with the said No.2 fiber placing groove. The said No.1 contact structure is equipped with a convex body that contacts with the said No.3 fiber placing groove.

Preferably, the said fixture body is also equipped with No.4 fiber placing groove, linked together with No.1 fiber placing groove. The bottom of the said No.4 fiber placing groove is higher than the one of the said No.1. The said clamp cover is equipped with No.2 contact structure that contacts with the said No.4 fiber placing groove.

Preferably, the said No.2 contact structure includes No.1 rubber blanket.

Preferably, the cross section of the said No.1 fiber placing groove is arc-shaped.

Preferably, the said elastomer includes sponge.

Preferably, the said No.1 contact structure includes No.2 rubber blanket, and the said convex body is a protruded ridge which is set on the said No.2 rubber blanket and made integrally with the No.2 rubber blanket.

Preferably, the said clamp cover is equipped with a lock slot, and the said clamp body is equipped with a lock junctor that can lock with the said lock slot.

A multi-function cutting fixture for optical fiber cutting device includes the clamp body and the clamp cover. One side of the said clamp body is pivoted to the said clamp cover. The said clamp body is equipped at least with No.1 fiber placing groove, No.2 fiber placing groove and No.3 fiber placing groove. The said clamp cover is equipped with the elastomer that contacts with the said No.1 fiber placing groove, and No.1 contact structure that contacts with the said No.2 fiber placing groove. The said No.1 contact structure is equipped with a convex body that contacts with the said No.3 fiber placing groove.

Preferably, the said fixture body is also equipped with No.4 fiber placing groove, linked together with No.1 fiber placing groove. The bottom of the said No.4 fiber placing groove is higher than the one of the said No.1. The said clamp cover is equipped with No.2 contact structure that contacts with the said No.4 fiber placing groove.

Preferably, the other side of the said clamp body is clamping connected to the said clamp cover. The said clamp cover is equipped with a lock slot, and the said clamp body is equipped with a lock junctor that can lock with the said lock slot.

Preferably, the said No.2 contact structure includes No.1 rubber blanket.

Preferably, the cross section of the said No.1 fiber placing groove is arc-shaped.

Preferably, the said elastomer includes sponge.

Preferably, the said No.1 contact structure includes No.2 rubber blanket, and the said convex body is a protruded ridge which is set on the said No.2 rubber blanket and made integrally with the No.2 rubber blanket.

Compared with the prior art, the utility model of multi-function cutting fixture can hold a variety of types of optical fiber. When holding different types of optical fiber, we do not need to change the fixture, greatly improving the work efficiency.

EMBODIMENT

Figure 1:
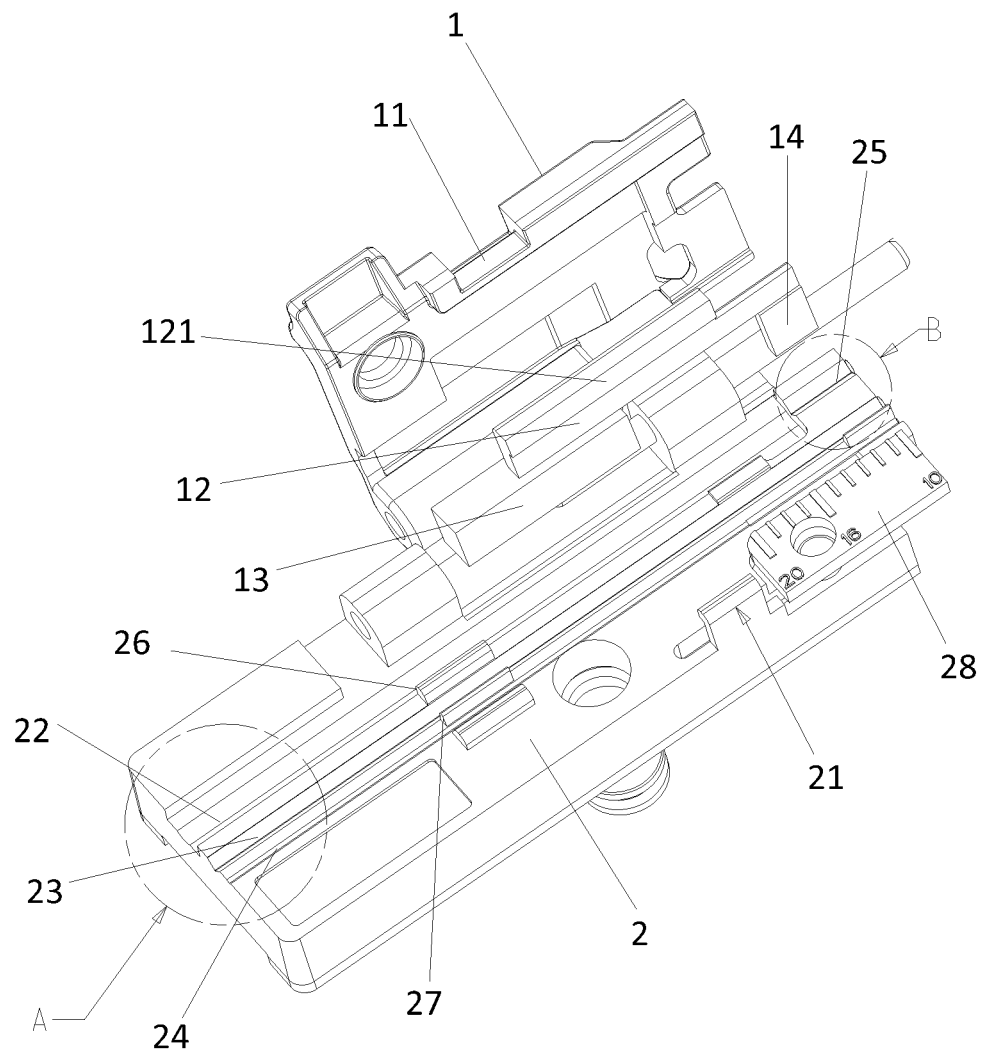
FIG. 1 is the structure schematic diagram of the multi-function cutting fixture of the utility model.
Figure 2:
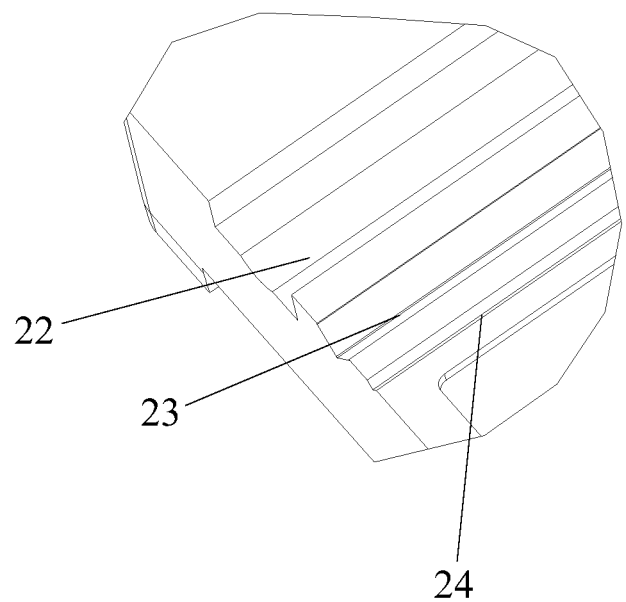
FIG. 2 is the enlarged view of part A in FIG. 1.

The utility model is described in details with the appended drawings below. Referring to the FIGS. 1 and 4 please, the utility model of multi-function cutting fixture 30 used in optical fiber cutting device 40 includes the clamp body 2 and the clamp cover 1. One side of the clamp body 2 is pivoted to the clamp cover 1, and the other side of the clamp body 2 is clamping connected to the clamp cover 1. The clamp body 2 is equipped with at least No.1 fiber placing groove 22, No.2 fiber placing groove 23 and No.3 fiber placing groove 24. No.1 fiber placing groove, No.2 fiber placing groove and No.3 fiber placing groove are arranged in parallel on the clamp body 2. Each fiber placing groove has a distal end located at a same rim end of the clamp body 2. A first protrusion 26 is configured on the clamp body and in between the No.1 fiber placing groove and the No.2 fiber placing groove, and a second protrusion 27 is configured on the clamp body and in between the No.2 fiber placing groove and the No.3 fiber placing groove. The clamp body is further equipped with a scale plate 28 for measuring a distance between a peeling point and a cutting point of a fiber to be cut. The scale plate 28 is parallel with the No.1 fiber placing groove, No.2 fiber placing groove and No.3 fiber placing groove. The clamp cover 1 is equipped with the elastomer 13 that contacts with No.1 fiber placing groove 22, and No.1 contact structure 12 that contacts with No.2 fiber placing groove 23. No.1 contact structure 12 is equipped with a convex body 121 that contacts with No.3 fiber placing groove 24.

Figure 3:
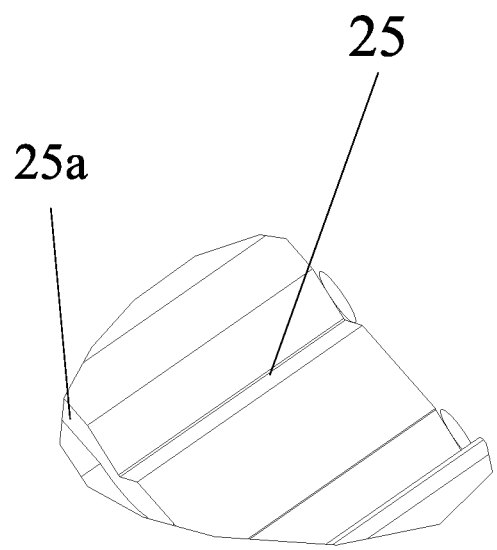
FIG. 3 is the enlarged view of part B in FIG. 1.

Preferably, the fixture body 2 is also equipped with No.4 fiber placing groove 25, linked together with No.1 fiber placing groove 22. The bottom of No.4 fiber placing groove 25 is higher than the bottom of No.1 fiber placing groove 22 and is connected to the bottom of No.1 fiber placing groove 22 through a vertical surface 25a as shown in FIG. 3. The clamp cover 1 is equipped with No.2 contact structure 14 that contacts with No.4 fiber placing groove 25. No.4 fiber placing groove 25 is used to hold the 900 um optical fiber in the jumper wire, and it can make the 900 um fiber part keep steady for cutting, and also make the section of the cut fiber smoother.

Preferably, No.2 contact structure 14 is a rubber blanket. When the clamp body 2 is clamping connected to the clamp cover 1, the rubber blanket can compact the 900 um optical fiber facilitating cutting the fiber core. The said 900 um optical fiber is exposed for cutting with the jacket of the fiber peeled off, and is placed in No.4 fiber placing groove 25.

Preferably, the cross section of No.1 fiber placing groove 22 is arc-shaped. No.1 fiber placing groove 22 is used to hold jacket cables and jumper wires. The arc-shaped cross section of No.1 fiber placing groove 22 is adapted to the sheaths of the jacket cable and jumper wire.

Preferably, the elastomer 13 is the sponge. When the clamp body 2 is pivoted to the clamp cover 1, the sponge can compact the jacket cable or jumper wire which is placed in No.1 fiber placing groove 22, facilitating cutting its inner optical fiber. Due to the large amount of compression of the sponge, even if the cross section diameter of the jacket cable is different from the one of the jumper wire, the sponge can also clamp the jacket cable and jumper wire tightly when clamped in No.1 fiber placing groove 22.

Preferably, No.1 contact structure 12 is a rubber blanket. The convex body 121 is a protruded ridge which is set on the said rubber blanket and made integrally with the rubber blanket. When the clamp body 2 is pivoted to the clamp cover 1, the rubber blanket can compact the 900 um optical fiber which is placed in No.2 fiber placing groove 23, facilitating cutting the inner fiber core of the 900 um optical fiber. At the same time, the protruded ridge can compact the 250 um optical fiber which is placed in No.3 fiber placing groove 24, facilitating cutting the inner fiber core of the 250 um optical fiber.

Figure 5:
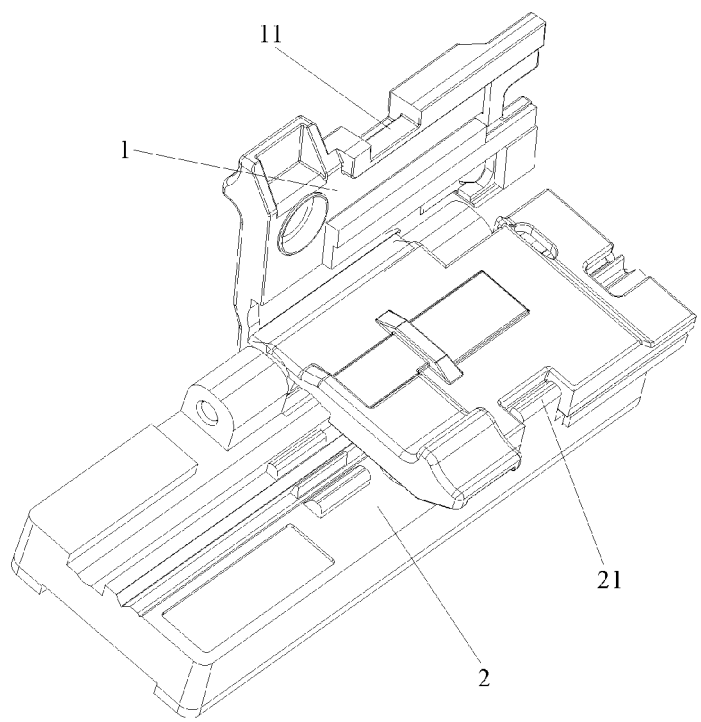
FIG. 5 is the structure schematic diagram of the multi-function cutting fixture of the utility model.

Preferably, refer to the FIG. 5 please. The clamp cover 1 is equipped with lock slot 11, and the clamp body 2 is equipped with lock junctor 21 that can lock with the lock slot 11. When the lock junctor 21 is matched with the lock slot 11, it will clamp the optical fiber placed in the fiber placing groove.

Figure 4:
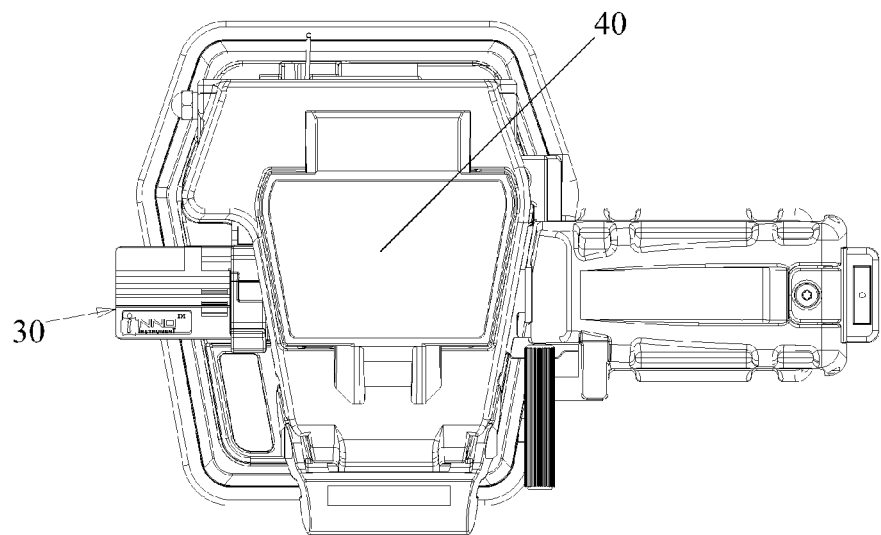
FIG. 4 is the structure schematic diagram of the multi-function cutting fixture of the utility model which is used to fix the optical fiber in cutting process.

Refer to the FIGS. 1 and 4 please. The utility model of multi-function cutting fixture 30 used for optical fiber cutting device 40 includes the clamp body 2 and the clamp cover 1. One side of the clamp body 2 is pivoted to the clamp cover 1. The clamp body 2 is equipped with at least No.1 fiber placing groove 22, No.2 fiber placing groove 23 and No.3 fiber placing groove 24. The clamp cover 1 is equipped with the elastomer 13 that contacts with No.1 fiber placing groove 22, and No.1 contact structure 12 that contacts with No.2 fiber placing groove 23. No.1 contact structure 12 is equipped with a convex body 121 that contacts with No.3 fiber placing groove 24.

Preferably, refer to the FIG. 5 please. The other side of the clamp body 2 is clamping connected to the clamp cover 1. The clamp cover 1 is equipped with lock slot 11, and the clamp body 2 is equipped with lock junctor 21 that can lock with the lock slot 11. When the lock junctor 21 is matched with the lock slot 11, it will clamp the optical fiber placed in the fiber placing groove. Furthermore, the clamp body could also connect with the clamp cover via magnets.

Preferably, the fixture body 2 is also equipped with No.4 fiber placing groove 25, linked together with No.1 fiber placing groove 22. The bottom of No.4 fiber placing groove 25 is higher than the bottom of No.1 fiber placing groove 22. The clamp cover 1 is equipped with No.2 contact structure 14 that contacts with No.4 fiber placing groove 25. No.4 fiber placing groove 25 is used to hold the 900 um optical fiber in the jumper wire, and it can make the 900 um fiber part keep steady for cutting, and also make the section of the cut fiber smoother.

Preferably, No.2 contact structure 14 is a rubber blanket. When the clamp body 2 is clamping connected to the clamp cover 1, the rubber blanket can compact the 900 um optical fiber facilitating cutting the fiber core. The said 900 um optical fiber is exposed for cutting with the jacket of the fiber peeled off, and is placed in No.4 fiber placing groove 25.

Preferably, the cross section of No.1 fiber placing groove 22 is arc-shaped. No.1 fiber placing groove 22 is used to hold jacket cables and jumper wires. The arc-shaped cross section of No.1 fiber placing groove 22 is adapted to the sheaths of the jacket cable and jumper wire.

Preferably, the elastomer 13 is the sponge. When the clamp body 2 is pivoted to the clamp cover 1, the sponge can compact the jacket cable or jumper wire which is placed in No.1 fiber placing groove 22, making it convenient to cut its inner optical fiber. Due to the large amount of compression of the sponge, even if the cross section diameter of the jacket cable is different from the one of the jumper wire, the sponge can also clamp the jacket cable and jumper wire tightly when clamped in No.1 fiber placing groove 22.

Preferably, No.1 contact structure 12 is a rubber blanket. The convex body 121 is a protruded ridge which is set on the said rubber blanket and made integrally with the rubber blanket. When the clamp body 2 is pivoted to the clamp cover 1, the rubber blanket can compact the 900 um optical fiber which is placed in No.2 fiber placing groove 23, making it convenient to cut the inner fiber core of the 900 um optical fiber. At the same time, the protruded ridge can compact the 250 um optical fiber which is placed in No.3 fiber placing groove 24, making it convenient to cut the inner fiber core of the 250 um optical fiber.

The utility model of multi-function cutting fixture can hold a variety of types of optical fiber. When holding different types of optical fiber, we do not need to change the fixture, greatly improving the work efficiency.

The above disclosed are only several specific embodiments of this application, but this application is not limited to the above, and any changes thought by those skilled in this field should fall in the scope of the protection of this application.

The invention claimed is:
1. A multi-function cutting fixture for optical fiber cutting device, comprising: a clamp body and a clamp cover;
wherein:
one side of the clamp body is pivoted to the clamp cover, the other side of the clamp body is clamping connected to the clamp cover, the clamp body is equipped with at least a first fiber placing groove for holding a first type of optical fiber, a second fiber placing groove for holding a second type of optical fiber, a third fiber placing groove for holding a third type of optical fiber and a fourth fiber placing groove coaxially linked together with the first fiber placing groove at a longitudinal direction of the clamp body, wherein a V-shaped bottom of the fourth fiber placing groove is higher than an arc-shaped bottom of the first fiber placing groove, and the V-shaped bottom of the fourth fiber placing groove and the arc-shaped bottom of the first fiber placing groove are stair-shapedly connected by a vertical surface;

the first fiber placing groove, the second fiber placing groove and the third fiber placing groove are arranged in parallel on the clamp body, and have different sizes for holding corresponding optical fibers with different outer diameters, each having a distal end located at a same rim end of the clamp body;

the clamp cover is equipped with an elastomer that contacts with the first fiber placing groove and a first contact structure that contacts with the second fiber placing groove, and the first contact structure is equipped with a convex body that contacts with the third fiber placing groove.

2. The multi-function cutting fixture according to claim 1, wherein:

the first fiber placing groove is configured to hold a sheathed portion of an optical fiber, and the fourth fiber placing groove is configured to hold a peeled-off portion of the same optical fiber, and the clamp cover is equipped with a second contact structure that contacts with the fourth fiber placing groove.

3. The multi-function cutting fixture according to claim 2, wherein the second contact structure includes a first rubber blanket.

4. The multi-function cutting fixture according to claim 1, wherein a cross section of the first fiber placing groove is arc-shaped.

5. The multi-function cutting fixture according to claim 1, wherein the elastomer includes sponge.

6. The multi-function cutting fixture according to claim 1, the first contact structure includes a second rubber blanket, and the convex body is a protruded ridge which is set on the second rubber blanket and made integrally with the second rubber blanket.

7. The multi-function cutting fixture according to claim 1, wherein the clamp cover is equipped with a lock slot, and the clamp body is equipped with a lock junctor that can lock with the lock slot.

8. The multi-function cutting fixture according to claim 1, wherein a length of the second fiber placing groove is the same as a longitudinal length of the clamp body; and a length of the third fiber placing groove is the same as the longitudinal length of the clamp body.

9. The multi-function cutting fixture according to claim 1, wherein:

the second fiber placing groove is configured to hold a 900 µm optical fiber; and the third fiber placing groove is configured to hold a 250 µm optical fiber.

10. The multi-function cutting fixture according to claim 2, wherein:

a total length of the first fiber placing groove and the fourth fiber placing groove is the same as a longitudinal length of the clamp body.

11. The multi-function cutting fixture according to claim 5, wherein:

the first fiber placing groove and the fourth fiber placing groove are configured to hold both jacket cables and jumper wires.

12. The multi-function cutting fixture according to claim 2, wherein:

the clamp body is further equipped with a scale plate that is parallel with the first fiber placing groove, the second fiber placing groove, the third fiber placing groove, and the fourth fiber placing groove;

wherein the scale plate is able to measure a distance between a peeling point and a cutting point of a fiber to be cut, a length of the scale plate is longer than the entire length of the fourth fiber placing groove.

13. The multi-function cutting fixture according to claim 1, further comprising:

a first protrusion configured on the clamp body and in between the first fiber placing groove and the second fiber placing groove;

a second protrusion configured on the clamp body and in between the second fiber placing groove and the third fiber placing groove; and wherein when the clamp cover is closed on the clamp body, the clamp covers the entire fourth fiber placing groove, and a part of the first fiber placing groove, the second fiber placing groove and the third fiber placing groove, and the clamp exposes the first protrusion, the second protrusion, and another part of the first fiber placing groove, the second fiber placing groove and the third fiber placing groove.

14. A multi-function cutting fixture for optical fiber cutting device, comprising: a clamp body and a clamp cover; wherein:

one side of the clamp body is pivoted to the clamp cover, the clamp body is equipped with at least a first fiber placing groove, a second fiber placing groove, a third fiber placing groove and a fourth fiber placing groove;

the first fiber placing groove, the second fiber placing groove and the third fiber placing groove are arranged in parallel on the clamp body, and have different sizes for holding corresponding optical fibers with different outer diameters, each having a distal end located at a same rim end of the clamp body;

the clamp cover is equipped with an elastomer that contacts with the first fiber placing groove and a first contact structure that contacts with the second fiber placing groove, the first contact structure is equipped with a convex body that contacts with the third fiber placing groove, and the fourth fiber placing groove is coaxially linked together with the first fiber placing groove at a longitudinal direction of the clamp body, a V-shaped bottom of the fourth fiber placing groove is higher than an arc-shaped bottom of the first fiber placing groove, and the V-shaped bottom of the fourth fiber placing groove and the arc-shaped bottom of the first fiber placing groove are stair-shapedly connected by a vertical surface.

15. The multi-function cutting fixture according to claim 14, wherein:

the first fiber placing groove is configured to hold a sheathed portion of an optical fiber, and the fourth fiber placing groove is configured to hold a peeled-off portion of the same optical fiber; and the clamp cover is equipped with a second contact structure that contacts with the fourth fiber placing groove.

16. The multi-function cutting fixture according to claim 14, wherein:
the other side of the clamp body is clamping connected to the clamp cover;
the clamp cover is equipped with a lock slot, and the clamp body is equipped with a lock junctor that can lock with the lock slot.

17. The multi-function cutting fixture according to claim 14, wherein a second contact structure includes a first rubber blanket.

18. The multi-function cutting fixture according to claim 14, wherein a cross section of the first fiber placing groove is arc-shaped.

19. The multi-function cutting fixture according to claim 14, wherein the elastomer includes sponge.

20. The multi-function cutting fixture according to claim 14, the first contact structure includes a second rubber blanket, and the convex body is a protruded ridge which is set on the second rubber blanket and made integrally with the second rubber blanket.

\* \* \* \* \*